US008600595B2

(12) United States Patent
Gleason et al.

(10) Patent No.: US 8,600,595 B2
(45) Date of Patent: Dec. 3, 2013

(54) POWER MODULE ACTIVE CURRENT MANAGEMENT FOR EFFICIENCY IMPROVEMENT

(75) Inventors: Sean E. Gleason, West Bloomfield, MI (US); Mohammad N. Anwar, Van Buren Township, MI (US); David P. Tasky, Farmington Hills, MI (US); Shawn Scott Hawkins, Shelby Township, MI (US); Peter J. Savagian, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 295 days.

(21) Appl. No.: 12/845,804

(22) Filed: Jul. 29, 2010

(65) Prior Publication Data
US 2012/0029741 A1 Feb. 2, 2012

(51) Int. Cl.
*B60L 9/00* (2006.01)
(52) U.S. Cl.
USPC .............................. 701/22; 180/65.1; 318/139
(58) Field of Classification Search
USPC ........... 701/78, 84, 87, 22; 318/139; 180/65.1
See application file for complete search history.

(56) References Cited

U.S. PATENT DOCUMENTS

| 7,973,499 | B2 * | 7/2011 | Yoshioka | 318/139 |
| 2003/0137037 | A1 * | 7/2003 | Omura et al. | 257/678 |
| 2005/0093494 | A1 * | 5/2005 | Nagayama | 318/139 |
| 2007/0007922 | A1 * | 1/2007 | Sarlioglu et al. | 318/438 |
| 2007/0012492 | A1 * | 1/2007 | Deng et al. | 180/65.1 |
| 2008/0186014 | A1 * | 8/2008 | Sutardja et al. | 324/120 |
| 2009/0115358 | A1 * | 5/2009 | Kachi et al. | 318/139 |
| 2009/0289583 | A1 * | 11/2009 | Yoshida | 318/400.01 |
| 2010/0084205 | A1 * | 4/2010 | Tarchinski et al. | 180/65.1 |
| 2010/0127648 | A1 * | 5/2010 | Akiyama | 318/400.11 |
| 2011/0284928 | A1 * | 11/2011 | Shibata et al. | 257/195 |

FOREIGN PATENT DOCUMENTS

DE 102004006753 A1 1/2005

* cited by examiner

*Primary Examiner* — Thomas Black
*Assistant Examiner* — Shardul Patel
(74) *Attorney, Agent, or Firm* — Quinn Law Group, PLLC

(57) ABSTRACT

A vehicle includes a motor, an alternating current (AC) power bus, a power inverter module (PIM), and a controller. The PIM includes a semiconductor die assembly with semiconductor power switches arranged in electrical parallel for delivering AC power to the motor via the bus. The controller determines an operating mode of the vehicle, selects and activates a designated one of the switches during a threshold low-current state of the PIM, and selects and activates all of the switches during a high-current state of the PIM. A PIM assembly for the vehicle includes the die assembly and controller. A method for optimizing energy efficiency of the vehicle includes providing the die assembly noted above, automatically determining the operating mode, and selecting and activating one of the switches when the operating mode corresponds to the threshold low-current state, and all of the electrical switches during the threshold high-current state of the PIM.

14 Claims, 3 Drawing Sheets

POWER MODULE ACTIVE CURRENT MANAGEMENT FOR EFFICIENCY IMPROVEMENT

TECHNICAL FIELD

The present invention relates to the automatic control of a vehicle power inverter module.

BACKGROUND

An electric motor for propelling a vehicle is typically energized using relatively high-voltage alternating current (AC) power, which is provided to the electric motor over an AC power bus via an onboard power inverter module (PIM). The PIM is electrically connected to a direct current (DC) energy storage system (ESS), e.g., a rechargeable battery, and automatically converts DC power from the ESS to AC power at levels suitable for driving the electric motor. When the motor is operating as a generator, such as during a regenerative braking event, the functionality of the PIM is automatically reversed such that AC power delivered by the generator is converted into DC power. The ESS is thus recharged for use during future electric propulsion modes.

Modern automotive PIMs include semiconductor die assemblies that perform a semiconductor-based power switching function in response to onboard control logic. For example, transistors such as metal-oxide semiconductor field-effect transistors (MOSFETs) and insulated gate bipolar transistors (IGBTs), as well as diodes and other electronic components, may form portions of the die assemblies to provide power switching functionality. Control of the power switching function ultimately provides the electric motor with the requisite multi-phase high-voltage AC power.

SUMMARY

Accordingly, a vehicle is provided herein that includes an electric motor, a high-voltage alternating current (AC) power bus, a power inverter module (PIM), and a controller. The PIM is electrically connected to the electric motor via the AC power bus, and includes a silicon or semiconductor die assembly having a plurality of semiconductor power switches arranged in electrical parallel, with the power switches delivering AC power to the electric motor via the AC power bus. The controller has an algorithm for determining an operating mode of the vehicle. Using the algorithm, the controller selects and activates a designated one of the power switches when the operating mode corresponds to a threshold low-current state of the PIM, and selects and activates all of the power switches when the operating mode corresponds to a threshold high-current state of the PIM.

A PIM assembly for use with the vehicle noted above includes a semiconductor die assembly for delivering AC power to the electric motor over the AC power bus using a plurality of power switches arranged in electrical parallel within the semiconductor die assembly. The PIM assembly includes a controller having an algorithm adapted for determining an operating mode of the vehicle, and for selecting and activating a designated one of the power switches when the operating mode corresponds to a threshold low-current state of the PIM. The controller selects and activates all of the power switches when the operating mode corresponds to a threshold high-current state of the PIM.

A method for optimizing energy efficiency of a vehicle having a PIM, a controller, and a multi-phase electric machine includes providing a semiconductor die assembly having a plurality of power switches arranged in electrical parallel, wherein the semiconductor die assembly delivers AC power to the electric machine, and wherein the controller determines an operating mode of the vehicle. The method further includes selecting and activating only one of the power switches via the controller when the operating mode corresponds to a threshold low-current state of the PIM, and selecting and activating all of the power switches via the controller when the operating mode corresponds to a threshold high-current state of the PIM.

The above features and advantages and other features and advantages of the present invention are readily apparent from the following detailed description of the best modes for carrying out the invention when taken in connection with the accompanying drawings.

DETAILED DESCRIPTION

Figure 1:
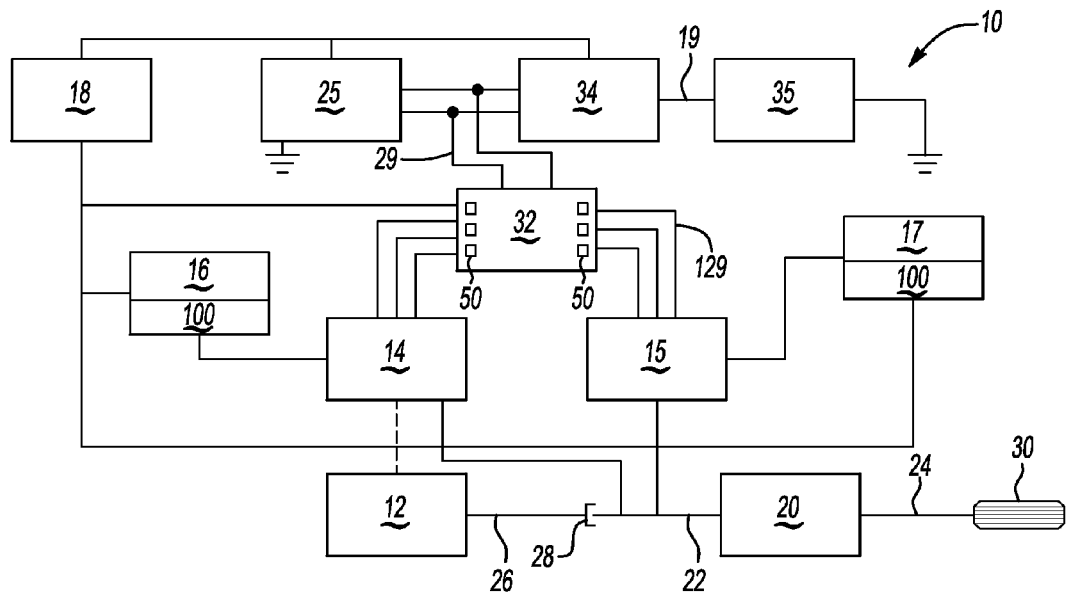
FIG. 1 is a schematic illustration of a vehicle having a power inverter module (PIM) assembly configured with semiconductor die assemblies and power switching logic as set forth herein.

Referring to the drawings, wherein like reference numbers correspond to like or similar components throughout the several figures, a vehicle 10 as shown in FIG. 1 includes a power inverter module (PIM) 32 and a control algorithm 100. Vehicle 10 may be configured as any vehicle having one or more electric motor/generator units (MGU) fed via a three-phase PIM, e.g., a hybrid electric vehicle (HEV), a plug-in HEV (PHEV), a battery electric vehicle (BEV), an extended-range HEV (EREV), etc. Algorithm 100 may be selectively executed by a designated controller as explained below, with the controller and PIM 32 forming a PIM assembly aboard vehicle 10. Algorithm 100 can be executed during certain threshold loading or electrical current states of the PIM in order to optimize the energy efficiency of vehicle 10.

Algorithm 100, which is described in detail below with reference to FIG. 4, works in conjunction with specially designed silicon or semiconductor die assemblies 50 functioning as power switches as explained below with reference to FIGS. 2 and 3. A designated controller selects and activates a designated one or more power switches within the semiconductor die assemblies 50 when an operating mode of vehicle 10 corresponds to a threshold low-current state of the PIM 32, and selects and activates all of the power switches when the operating mode corresponds to a threshold high-current state of the PIM, as set forth below.

In one embodiment, vehicle 10 may include an internal combustion engine (E) 12 and respective first and second MGUs 14 and 15. Depending on the vehicle configuration, one of the MGUs, for example MGU 14, may be used to selectively crank and start engine 12, as indicated by the broken line in FIG. 1, or to selectively power the vehicle 10, while the second MGU 15 can be used to selectively power the vehicle when the engine is on, i.e., engine assist, or when the engine is off during an electric-only (EV) operating mode. Other single or multi-MGU configurations of the vehicle 10 are also possible, including EV configurations that do not require an engine, or multi-MGU configurations wherein either or both MGUs can serve as traction motors for propelling the vehicle.

Controllers 16, 17 are electrically connected to the MGUs 14 and 15, respectively, and to the PIM 32. Controllers 16, 17 may be programmed to control the functionality of the corresponding MGU. Each controller 16, 17 may also be programmed with or provided access to algorithm 100, the execution of which controls selecting and power switch activation within the PIM 32 under various threshold PIM electrical loads and/or low-current states. In one embodiment, controllers 16, 17 may be dependent secondary controllers, e.g., motor control processors (MCP) in communication with a high-level or primary controller 18, e.g., a hybrid control processor (HCP) as is well understood in the art, although the algorithm 100 may be hosted and/or executed by other controllers aboard the vehicle 10 depending on the design of the vehicle.

Vehicle 10 further includes a transmission 20 having an input member 22 and an output member 24. A driveshaft 26 of engine 12 may be selectively connected to input member 22 via a clutch 28. Transmission 20 may be configured as an electrically-variable transmission or any other suitable transmission capable of transmitting torque to drive wheels 30 via the output member 24.

Still referring to FIG. 1, each MGU 14, 15 may be configured as a multi-phase electric machine rated for approximately 60 VAC to approximately 300 VAC or more depending on the vehicle design. Each MGU 14, 15 may be electrically connected to a high-voltage energy storage system (ESS) 25 via a high-voltage direct current (DC) power bus 29, the PIM 32, and a high-voltage alternating current (AC) power bus 129. The ESS 25 may be selectively recharged, for example by capturing energy via the MGU 14 during a regenerative braking event.

The vehicle 10 may further include an auxiliary power module (APM) 34, e.g., a DC-DC power converter, which is electrically connected to the ESS 25 via the DC power bus 29. The APM 34 may also be electrically connected to an auxiliary battery (AUX) 35, e.g., a 12-volt DC battery, via a low-voltage power bus 19, and adapted for energizing one or more auxiliary systems aboard the vehicle 10, e.g., windshield wipers, radio, power door locks, etc.

Controllers 16, 17 may be integrated into a single vehicle control device or configured as a distributed vehicle control device in electrical communication with each of the MGUs 14, 15. Control connections may include any required transfer conductors, e.g., a hard-wired or wireless control link(s) or path(s) suitable for transmitting and receiving the necessary electrical control signals for proper power flow control and coordination aboard the vehicle 10. The controllers 16, 17 may include such control modules and capabilities as might be necessary to execute all required diagnostic functionality aboard the vehicle 10. Controllers 16, 17, and 18 may be configured as a digital computer having a microprocessor or central processing unit, read only memory (ROM), random access memory (RAM), electrically-erasable programmable read only memory (EEPROM), high speed clock, analog-to-digital (A/D) and digital-to-analog (D/A) circuitry, and input/output circuitry and devices (I/O), as well as appropriate signal conditioning and buffer circuitry.

Figure 2:
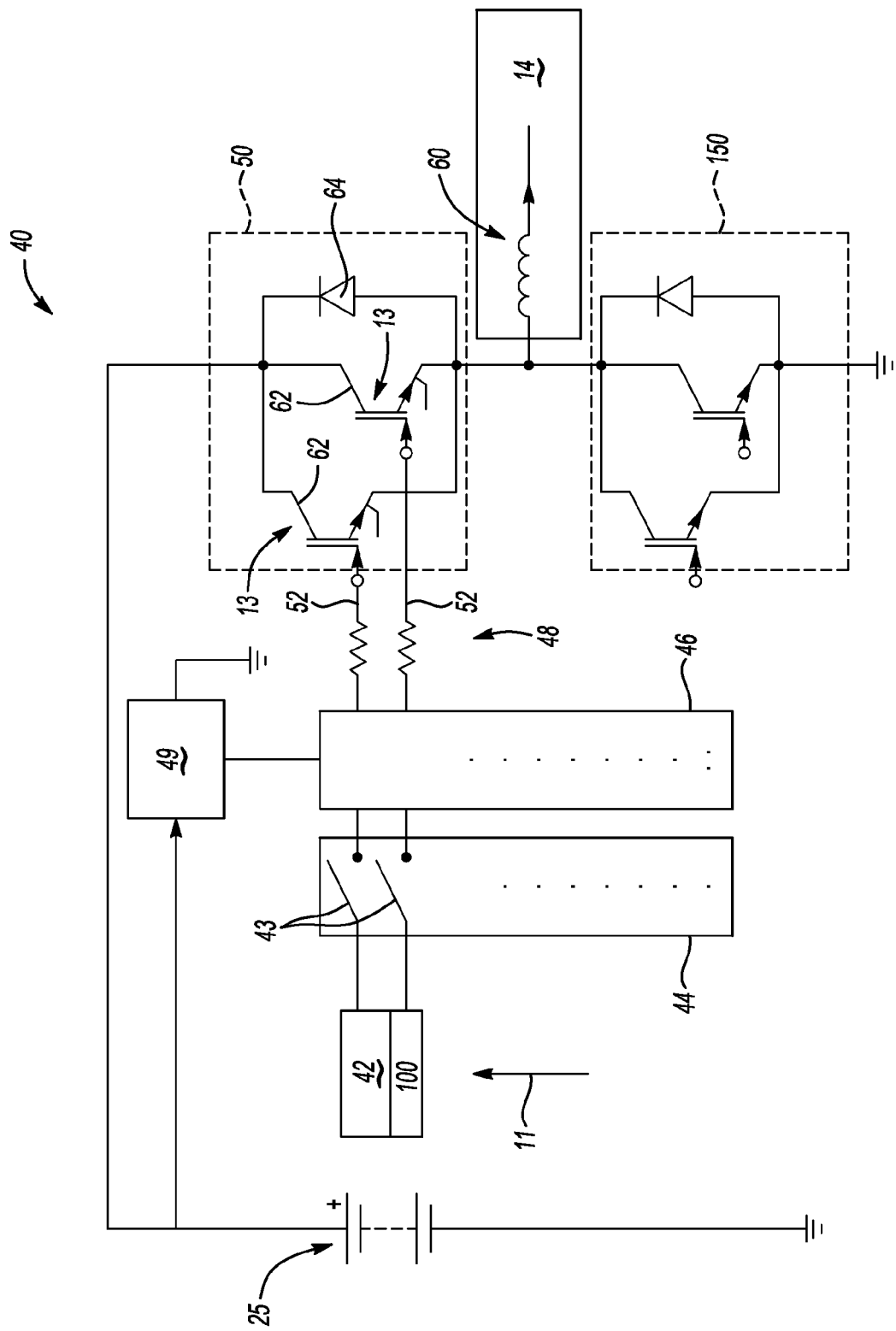
FIG. 2 is a schematic circuit diagram for the PIM assembly of the vehicle shown in FIG. 1 according to one embodiment.

Referring to FIG. 2, a circuit 40 includes the PIM 32 of FIG. 1. The PIM 32 in turn includes a logic circuit 44 that communicates with a central processing unit (CPU) 42. The CPU 42 itself may be hosted by either or both controllers 16 and 17 of FIG. 1, or may be part of the PIM or another suitable host device. As will be understood by those of ordinary skill in the art, an HEV, EREV, BEV, or any other vehicle using a PIM has different operating modes, e.g., wide open throttle, reverse or forward travel on a level surface or on a pronounced grade, low-speed travel, etc.

In some of these operating modes the PIM must be electrically loaded so that motor torque can be instantly delivered to the designated fraction motor when needed. For this reason, die assemblies for switching are typically arranged such that the power switches of such dies are arranged in electrical parallel, with electrical current flowing through four parallel switches in a typical configuration. However, in low-current operating modes when the PIM is not loaded, a small amount of electrical current must be moved through all four parallel switches, a practice which can result in switching and conduction losses in the PIM.

Figure 4:
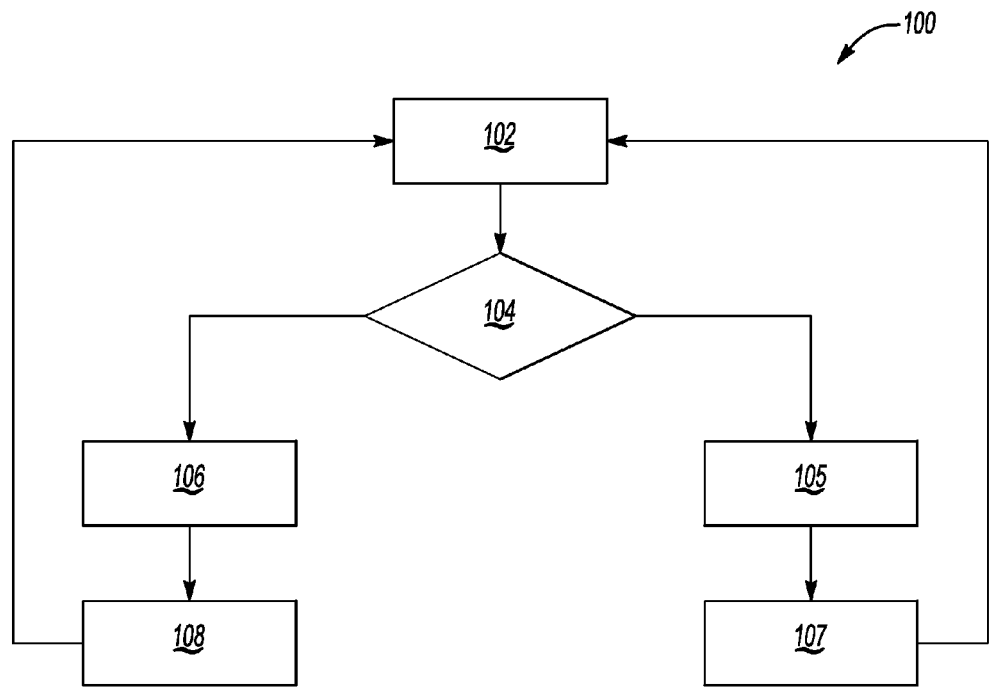
FIG. 4 is a flow chart describing a method for selecting and activating power switches for a PIM assembly as described herein.
Figure 3:
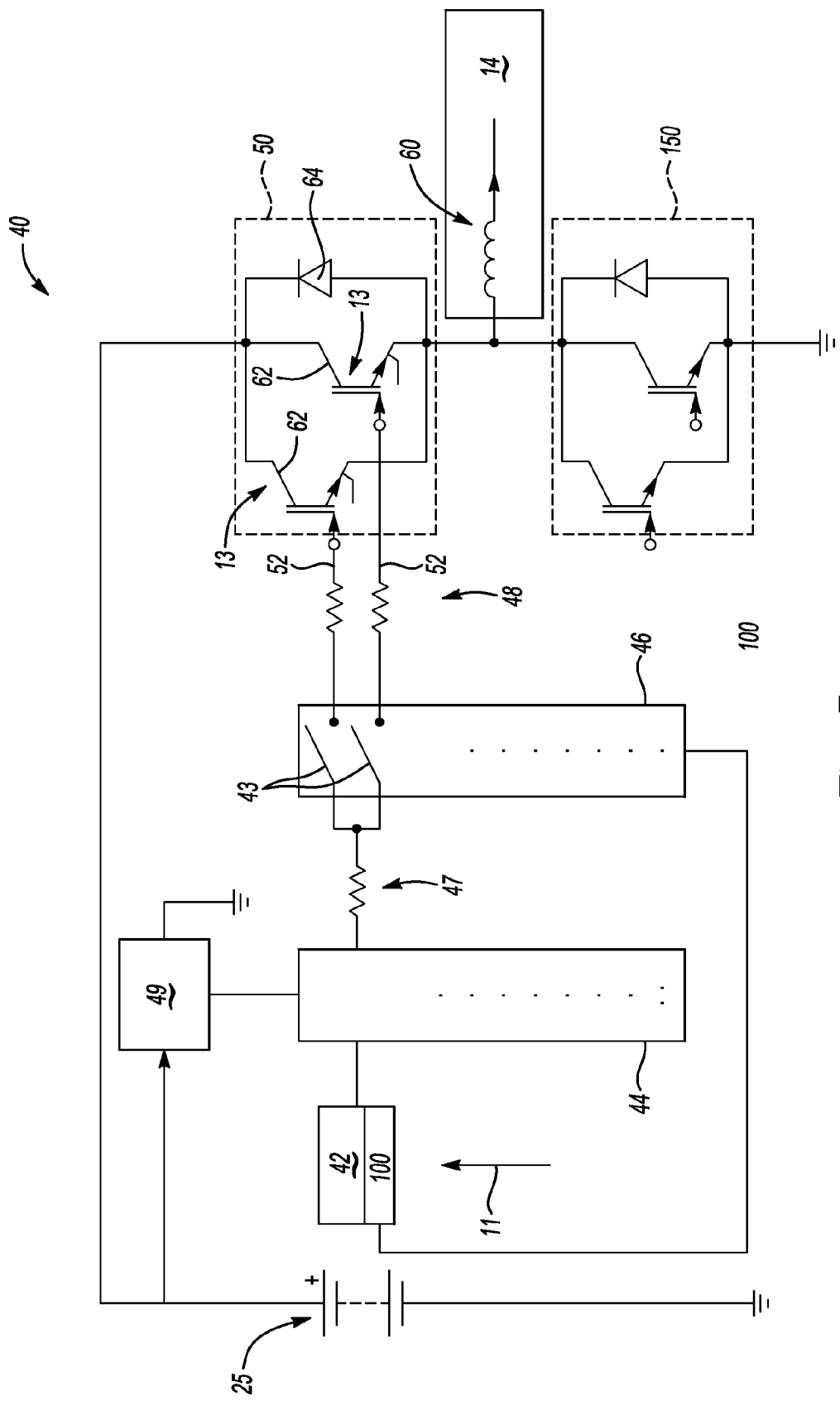
FIG. 3 is a schematic circuit diagram for the PIM assembly of FIG. 2 according to another embodiment.

The PIM 32 shown in FIG. 1, when configured as shown in FIG. 2 or 3 and used in conjunction with the algorithm 100 described in FIG. 4, helps minimize such energy losses by providing direct access to and control over each semiconductor power switch used within the PIM. A present operating mode/PIM electrical load level is identified, and only a minimum number of required power switches are activated during the operating mode. For example, under wide open throttle conditions, electrical current may be directed through all of the power switches. When current levels approach zero or a threshold minimum level, as few as one designated power switch may be selected and activated. The selected power switch may be alternated based on prior use information in order to minimize wear or use of any given power switch.

In one possible embodiment, and with reference again to the structure shown in FIG. 2, the PIM 32 of FIG. 1 may also include a logic circuit 44 having relays 43, a gate driver circuit 46 selectively energized via transmission of current across the relays 43 when closed, gate resistors 48, a biasing power supply 49 for biasing the gate driver circuit 46, and respective high- and low-switch semiconductor die assemblies 50, 150. The ESS 25 is electrically connected to each of the semiconductor die assemblies 50, 150, and to the biasing power supply 48.

CPU 42, e.g., of controller 16 or 17 of FIG. 1, or of another controller, is electrically connected to relays 43 within logic circuit 44, and receives phase current feedback signals 11 from the MGU 14, wherein the designated controller can determine the operating mode of the vehicle 10 of FIG. 1 by comparing a reference phase current indicated by signals 11 to a calibrated threshold. The output sides of each semiconductor die assembly 50, 150, both of which may be alternately embodied as a single device, feed into a designated phase winding 60 of a given MGU, i.e., one of the MGU 14 or 15 of FIG. 1. While only one phase winding 60 is shown in FIG. 2 for simplicity, each of the remaining two phase windings of a three-phase MGU are likewise connected to identical semiconductor die assemblies 50, 150.

Resistors 48 include a pair of resistors corresponding to different gates housed within the semiconductor die assembly 50. Semiconductor die assembly 50 includes a pair of transistors 62 and a diode 64 adapted to operate as a power semiconductor switch 13, hereinafter referred to as a power switch, and to thereby voltage on and off as needed based on commands from the CPU 42. These commands are determined based on current state of the PIM, i.e., the PIM load, or a particular corresponding vehicle operating mode as noted above and as set forth below with reference to FIG. 4. Semiconductor die assembly 50 requires a number of gate pins 52 equal to the number of transistors 62 used therein, with two gate pins being shown in FIG. 2 for an embodiment using two transistors. Each gate pin 52 is connected in series with a corresponding resistor 48.

Referring to FIG. 3, in an alternate embodiment the order of the logic circuit 44 and gate driver circuit 46 is swapped relative to their positions as shown in FIG. 2, and a resistor 47 is positioned between the logic and gate driver circuits. The resistance value of the resistor 47 may be selected based on the resistance values of the resistors 48. As will be understood by those of ordinary skill in the art, when both power switches 13 of the semiconductor die assembly 50 are turned on, ringing may occur across the gate resistors 48. The presence of the additional resistor 47 at the location shown in FIG. 3 may help alleviate such ringing.

Referring to FIG. 4, algorithm 100 is described with respect to semiconductor die assembly 50, although semiconductor die assembly 150 or semiconductor die assemblies for other electrical phases not shown here for simplicity can also be controlled per the steps of the present algorithm. Algorithm 100 begins at step 102, wherein the present operating mode of the vehicle 10 is detected. Phase current feedback signals 11 of FIGS. 2 and 3, e.g., from the MGU 14, may be determined via controller 16 when the controller 16 is configured as an MCP. Alternately, if controller 18 is configured as an HCP, it may signal the controller 16 with a commanded mode. Once the operating mode is detected at step 102 using any suitable means, the algorithm 100 proceeds to step 104.

At step 104, the algorithm 100 determines if the operating mode detected at step 102 is a predetermined low-current state of the PIM 32, i.e., a vehicle operating mode that does not require prior electrical loading of the PIM 32 shown in FIG. 1. For example, when a zero or near zero phase current is commanded by controller 16 and detected at step 102, a low-current state of the PIM 32 is indicated. Identification of the particular vehicle operating mode is not necessarily required at step 102, but merely a determination as to whether the presently detected mode corresponds to a threshold low-current state of the PIM 32, a condition for which switch isolation is warranted as explained below. The algorithm 100 proceeds to step 106 if the mode detected at step 102 is a low-current state, and proceeds instead to step 105 if the mode is not a low-current state.

At step 105, all power switches 13 in semiconductor die assembly 50 are selected, and electrical current is delivered to the different phase windings 60 of the MGU 14 of FIGS. 2 and 3 through all of the power switches in electrical parallel. The algorithm 100 proceeds to step 107.

At step 106, having determined at step 104 that the present mode is a low-current mode, one or more power switches 13 are selected. For zero to near zero current, a single power switch may be used rather than all power switches 13 arranged in electrical parallel in the conventional manner, although any number of power switches less than the total number is also possible depending on the mode.

As noted above, low-current states of the PIM 32 are present well over half of the time the vehicle 10 operates. To avoid overusing the same power switch 13, step 106 may optionally include tracking prior use information and alternating between different switches of the semiconductor die assembly 50 based on prior use information. For example, given two power switches 13 in a given semiconductor die assembly 50, the controller 16 may alternate between power switches in the semiconductor die assembly, or may increment a counter whenever a given power switch is actuated in order to track prior use. The algorithm 100 may then select the power switch 13 at step 106 after first consulting the counter. In this manner, excessive use and possible premature failure of one power switch relative to another can be avoided. The algorithm 100 then proceeds to step 108.

At step 107, the algorithm 100 activates all power switches 13 in electrical parallel, and thus powers the different phase windings 60 of the MGU 14. The algorithm 100 then repeats step 102 to determine if the operating mode has changed.

At step 108, the algorithm 100 activates the power switch 13 that was previously designated or selected at step 106, and thus powers the different phase windings 60 of the MGU 14 through the selected power switch alone. The algorithm 100 then repeats step 102 to determine if the operating mode has changed.

Execution of algorithm 100 as set forth above more closely matches the number of utilized power switches 13 to a number that is actually required, doing so based on the vehicle operating mode. Energy costs are thus minimized. For instance, energy loss occurring in the various power switches of the semiconductor die assemblies may be halved by activating only one power switch 13 instead of two, potentially saving as much as 15 W of power for the duration of the low-current modes. Likewise, energy dissipation within the semiconductor die assemblies 50, 150 of FIGS. 2 and 3, which is present as heat, can be reduced, with a reduction in energy loss also occurring in power consumption levels of the gate driver circuit 46 via the biasing power supply 49. Taken as a whole, algorithm 100 provides a potentially low-cost approach to increasing PIM efficiency at zero-to-low electrical load operating points of the PIM 32.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
an electric motor having phase windings;
a high-voltage alternating current (AC) power bus;
a power inverter module (PIM) electrically connected to the electric motor via the AC power bus, wherein the PIM includes a semiconductor die assembly having a plurality of semiconductor power switches arranged in electrical parallel, the power switches being operable for delivering AC power to the phase windings of the electric motor via the AC power bus; and
a controller configured to determine an operating mode of the vehicle;
wherein the controller is operable to select and activate at least one and fewer than all of the power switches when the operating mode corresponds to a threshold low-current state of the PIM, and selects and activates all of the power switches when the operating mode corresponds to a threshold high-current state of the PIM, such that electrical current flows to the phase windings only through all of the activated power switches in the threshold low-current and high-current states of the PIM.

2. The vehicle of claim 1, wherein the controller is configured to receive a reference phase current from the electric motor, and to determine the operating mode by comparing the received reference phase current from the electric motor to a calibrated threshold.

3. The vehicle of claim 1, wherein the controller is configured to track prior use information of each of the power switches, and for alternating use of each of the power switches based on the prior use information.

4. The vehicle of claim 1, wherein the die assembly includes a pair of gate pins and the PIM includes a pair of gate resistors each connected in series with a respective one of the gate pins.

5. The vehicle of claim 4, further comprising an additional resistor positioned with respect to the pair of gate resistors, and adapted to minimize ringing across the pair of gate resistors when each of the plurality of switches are simultaneously activated.

6. A power inverter module (PIM) assembly for use with a multi-phase electric motor having phase windings and with a high-voltage alternating current (AC) power bus, the PIM assembly comprising:
   a semiconductor die assembly configured to deliver AC power to the phase windings of the electric motor over the AC power bus using a plurality of semiconductor power switches arranged in electrical parallel within the die assembly; and
   a controller operable to determine an operating mode of the vehicle;
   wherein the controller selects and activates one or more but fewer than all of the power switches when the operating mode corresponds to a threshold low-current state of the PIM, and selects and activates all of the power switches when the operating mode corresponds to a threshold high-current state of the PIM, and wherein electrical current flows to the phase windings only through all of the activated semiconductor power switches in both the threshold low-current and high-current states.

7. The PIM assembly of claim 6, wherein the controller determines the operating mode by comparing a reference phase current from the electric motor to a calibrated threshold.

8. The PIM assembly of claim 6, wherein the controller is configured to track prior use information for each semiconductor power switch, and alternates activation of each power switch in the threshold low-current state based on the prior use information.

9. The PIM assembly of claim 6, wherein the die assembly includes a pair of gate pins and the PIM includes a pair of gate resistors each connected in electrical series with a respective one of the gate pins.

10. The PIM assembly of claim 9, further comprising an additional resistor positioned with respect to the pair of gate resistors, and adapted to minimize ringing across the pair of gate resistors when the plurality of power switches are simultaneously activated.

11. A method for optimizing energy efficiency of a vehicle having a power inverter module (PIM) assembly, a multi-phase electric motor having phase windings, and a high-voltage alternating current (AC) power bus electrically connecting the PIM assembly to the electric motor, the method comprising:
   providing the PIM with a semiconductor die assembly having a plurality of semiconductor power switches arranged in electrical parallel, wherein the die assembly delivers AC power to phase windings of the electric motor;
   automatically determining an operating mode of the vehicle via a controller;
   selecting and activating at least one but fewer than all of the power switches using the controller when the determined operating mode corresponds to a threshold low-current state of the PIM; and
   selecting and activating all of the power switches using the controller when the operating mode corresponds to a threshold high-current state of the PIM;
   wherein electrical current flows to the phase windings of the electric motor only through all of the activated semiconductor power switches in both the threshold low-current and high-current states.

12. The method of claim 11, further comprising:
   determining the operating mode by comparing a reference phase current from the electric motor to a calibrated threshold.

13. The method of claim 11, further comprising: tracking prior use information of each power switch, and alternating between each power switch using the prior use information.

14. The method of claim 11, wherein the die assembly includes a pair of gate pins and the PIM includes a pair of gate resistors each connected in electrical series with a respective one of the gate pins, the method further comprising
   positioning an additional resistor with respect to the pair of gate resistors; and
   minimizing ringing across the pair of gate resistors using the additional resistor when each of the plurality of switches are simultaneously activated.

* * * * *